(12) United States Patent
Shanmukhadas et al.

(10) Patent No.: US 9,288,441 B2
(45) Date of Patent: *Mar. 15, 2016

(54) DISTRIBUTED TRANSCODING OF A VIDEO BASED ON INSUFFICIENT COMPUTING RESOURCES

(71) Applicant: Logitech Europe S.A., Morges (CH)

(72) Inventors: Binu Kaiparambil Shanmukhadas, Bangalore (IN); Hitesh Chouhan, Bangalore (IN); Hrishikesh G. Kulkarni, Bangalore (IN); Sandeep Lakshmipathy, Bangalore (IN); Sudeep U. Nayak, Bangalore (IN); Vikas, Bangalore (IN)

(73) Assignee: Logitech Europe S.A., Morges (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/561,625

(22) Filed: Dec. 5, 2014

(65) Prior Publication Data

US 2015/0089030 A1    Mar. 26, 2015

Related U.S. Application Data

(63) Continuation of application No. 13/453,702, filed on Apr. 23, 2012, now Pat. No. 8,982,176.

(30) Foreign Application Priority Data

Feb. 29, 2012    (IN) ............................. 571/DEL/2012

(51) Int. Cl.
| | | |
|---|---|---|
| *H04N 7/15* | (2006.01) | |
| *G11B 27/10* | (2006.01) | |
| *H04N 5/85* | (2006.01) | |
| *H04N 7/14* | (2006.01) | |
| *H04N 19/40* | (2014.01) | |
| *H04L 29/06* | (2006.01) | |

(52) U.S. Cl.
CPC .............. *H04N 7/155* (2013.01); *G11B 27/105* (2013.01); *H04L 65/602* (2013.01); *H04N 5/85* (2013.01); *H04N 7/147* (2013.01); *H04N 7/15* (2013.01); *H04N 19/40* (2014.11)

(58) Field of Classification Search
CPC combination set(s) only.
See application file for complete search history.

(56) References Cited

U.S. PATENT DOCUMENTS

| | | |
|---|---|---|
| 4,737,863 A | 4/1988 | Eto |
| 4,855,843 A | 8/1989 | Ive |
| 6,359,902 B1 | 3/2002 | Putzolu |
| 6,587,456 B1 | 7/2003 | Rao |
| 6,741,608 B1 | 5/2004 | Bouis |
| 7,062,567 B2 | 6/2006 | Benitez |
| 7,133,922 B1 | 11/2006 | She |

(Continued)

*Primary Examiner* — Joseph J Nguyen
(74) *Attorney, Agent, or Firm* — Meyertons Hood Kivlin Kowert & Goetzel, P.C.; Jeffrey C. Hood; Joel L. Stevens

(57) ABSTRACT

A federated media server system. The federated media server system may include a plurality of media servers. A first media server may be coupled to a second media server over a network. The first media server may also be coupled to a third media server over the network. Additionally, the second and third media servers may be coupled to a plurality of respective clients. The first media server may be configured to record video, e.g., videoconferences, and stream recordings to clients and/or the second and third media servers. The second and third media servers may assist in performing video recording, transcoding, storage of recordings, multicasting, etc.

20 Claims, 13 Drawing Sheets

(56) References Cited

U.S. PATENT DOCUMENTS

| | | |
|---|---|---|
| 7,312,809 B2 | 12/2007 | Bain |
| 7,362,776 B2 | 4/2008 | Meier |
| 7,532,231 B2 | 5/2009 | Pepperell |
| 7,664,109 B2 | 2/2010 | Li |
| 7,692,683 B2 | 4/2010 | Kenoyer |
| 7,788,380 B2 | 8/2010 | Shim |
| 7,835,378 B2 | 11/2010 | Wijnands |
| 7,945,573 B1 | 5/2011 | Barnes |
| 7,986,637 B2 | 7/2011 | Panwar |
| 8,103,750 B2 | 1/2012 | O'Neal |
| 8,116,612 B2 | 2/2012 | Vasilevsky |
| 8,127,043 B2 | 2/2012 | Vecchio |
| 8,139,100 B2 | 3/2012 | King |
| 8,237,765 B2 | 8/2012 | King |
| 8,319,814 B2 | 11/2012 | King |
| 2004/0207724 A1* | 10/2004 | Crouch ............ H04L 29/06027 348/14.09 |
| 2007/0005804 A1* | 1/2007 | Rideout ............ H04L 12/1822 709/246 |
| 2007/0291108 A1 | 12/2007 | Huber |
| 2008/0075095 A1 | 3/2008 | Suryanarayana |
| 2008/0316295 A1 | 12/2008 | King |
| 2008/0316298 A1 | 12/2008 | King |
| 2010/0225736 A1 | 9/2010 | King |
| 2011/0261147 A1 | 10/2011 | Goyal |
| 2012/0274730 A1 | 11/2012 | Shanmukhadas |
| 2012/0274731 A1 | 11/2012 | Shanmukhadas |
| 2013/0027509 A1 | 1/2013 | Ranganath |

\* cited by examiner

DISTRIBUTED TRANSCODING OF A VIDEO BASED ON INSUFFICIENT COMPUTING RESOURCES

PRIORITY INFORMATION

This application is a continuation of U.S. application Ser. No. 13/453,702, titled "Distributed Transcoding of a Video Based on Insufficient Computing Resources", filed Apr. 23, 2012, whose inventors are Binu Kaiparambil Shanmukhadas, Hitesh Chouhan, Hrishikesh G. Kulkarni, Sandeep Lakshmipathy, Sudeep U. Nayak, and Vikas; which application claims benefit of priority of Indian Patent Application Number 571/DEL/2012 titled "Streaming a Videoconference Using Distributed Transcoding" filed Feb. 29, 2012, whose inventors were Binu Kaiparambil Shanmukhadas, Hitesh Chouhan, Hrishikesh G. Kulkarni, Sandeep Lakshmipathy, Sudeep U. Nayak and Vikas, both of which are hereby incorporated by reference in their entirety as though fully and completely set forth herein.

FIELD OF THE INVENTION

The present invention relates generally to video and, more specifically, to recording and distributing video streams.

DESCRIPTION OF THE RELATED ART

Recording and streaming video content has become increasingly popular. For example, many users want to have the ability to record and upload personal video files for consumption by others, e.g., video blogs, home videos, etc.

Additionally, it may be desirable to record and stream videoconferences. Videoconferencing may be used to allow two or more participants at remote locations to communicate using both video and audio. Each participant location may include a videoconferencing system for video/audio communication with other participants. Each videoconferencing system may include a camera and microphone to collect video and audio from a first or local participant to send to one or more other (remote) participants. Each videoconferencing system may also include a display and speaker to reproduce video and audio received from remote participant(s). Each videoconferencing system may also be coupled to a computer system to allow additional functionality into the videoconference. For example, additional functionality may include data conferencing (including displaying and/or modifying a document for both participants during the conference).

Present videoconferencing systems allow for some recording ability. However, many of these solutions are not sophisticated and are not as flexible as would be desired. Accordingly, improvements in recording and streaming of video content, e.g., videoconferences, are desired.

SUMMARY OF THE INVENTION

Various embodiments are presented of a system and method for recording and/or streaming a videoconference, e.g., using a federated media server system.

The federated media server system may include a plurality of media servers. A first media server may be coupled to a second media server over a network. The first media server may also be coupled to a third media server over the network. Additionally, the second and third media servers may be coupled to a plurality of respective clients. The first media server may be configured to record video, e.g., videoconferences, and stream recordings to clients and/or the second and third media servers.

The second and third media servers may assist in performing video recording, transcoding, storage of recordings, multicasting, etc. For example, the second and third media servers may be able to assist in performing recording or transcoding for the first media server (e.g., when resources, such as disk space or processing capacity, of the first media server are constrained). The second and third media servers may also be configured to receive a single stream from the first media server (e.g., over a wide area network) and perform multicasting of content to clients (e.g., over a local area network). In some cases, the second and third media servers may perform transcoding to provide client requested streaming formats, e.g., which are unavailable from the first media server.

Thus, a plurality of media servers may be able to distribute various functionality and provide a more robust and efficient recording and streaming system.

BRIEF DESCRIPTION OF THE DRAWINGS

A better understanding of the present invention may be obtained when the following detailed description is considered in conjunction with the following drawings, in which.

Figure 1:
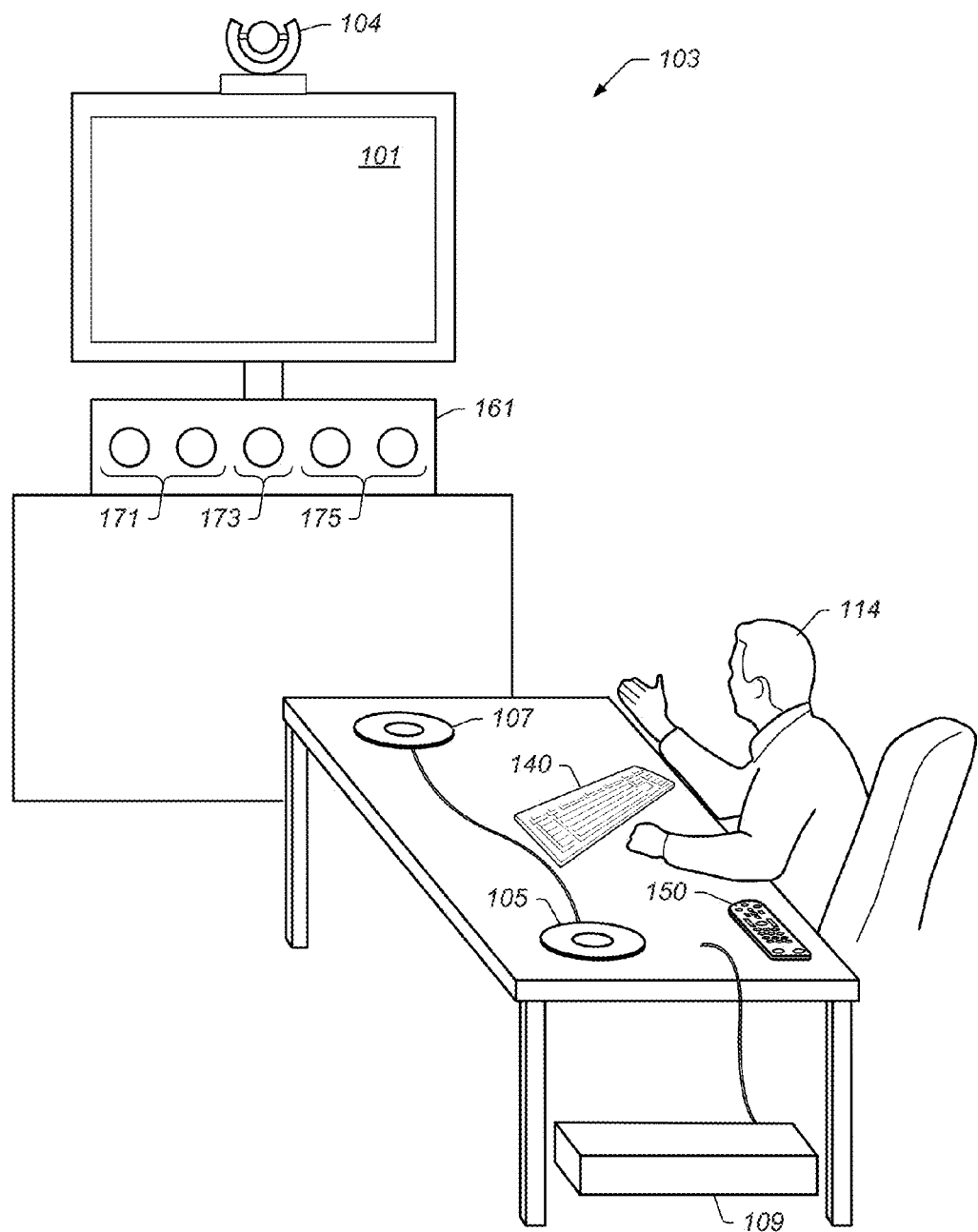
FIGS. 1 and 2 illustrate exemplary videoconferencing system participant locations, according to an embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE EMBODIMENTS

Incorporation by Reference

U.S. patent application titled "Video Conferencing System Transcoder", Ser. No. 11/252,238, which was filed Oct. 17, 2005, whose inventors are Michael L. Kenoyer and Michael V. Jenkins, is hereby incorporated by reference in its entirety as though fully and completely set forth herein.

U.S. patent application titled "Virtual Decoders", Ser. No. 12/142,263, which was filed Jun. 19, 2008, whose inventors are Keith C. King and Wayne E. Mock, is hereby incorporated by reference in its entirety as though fully and completely set forth herein.

U.S. patent application titled "Video Conferencing System which Allows Endpoints to Perform Continuous Presence Layout Selection", Ser. No. 12/142,302, whose inventors are Keith C. King and Wayne E. Mock, is hereby incorporated by reference in its entirety as though fully and completely set forth herein.

U.S. patent application titled "Video Conferencing Device which Performs Multi-way Conferencing", Ser. No. 12/142,340, whose inventors are Keith C. King and Wayne E. Mock, is hereby incorporated by reference in its entirety as though fully and completely set forth herein.

U.S. patent application titled "Video Decoder which Processes Multiple Video Streams", Ser. No. 12/142,377, whose inventors are Keith C. King and Wayne E. Mock, is hereby incorporated by reference in its entirety as though fully and completely set forth herein.

U.S. patent application titled "Virtual Multiway Scaler Compensation", Ser. No. 12/171,358, whose inventors are Keith C. King and Wayne E. Mock, is hereby incorporated by reference in its entirety as though fully and completely set forth herein.

U.S. patent application titled "Virtual Distributed Multipoint Control Unit", Ser. No. 12/712,947, whose inventors are Keith C. King, Ashish Goyal, and Hrishikesh Gopal Kulkarni, is hereby incorporated by reference in its entirety as though fully and completely set forth herein.

U.S. patent application titled "Recording a Videoconference Using a Recording Server", Ser. No. 13/093,902, whose inventors are Ashish Goyal, Binu Kaiparambil Shanmukhadas, Vivek Wamorkar, Keith C. King, Stefan F. Slivinski, Raphael Anuar, boby S. Pullamkottu, and Sunil George, is hereby incorporated by reference in its entirety as though fully and completely set forth herein.

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), smart phone, television system, grid computing system, or other device or combinations of devices. In general, the term "computer system" can be broadly defined to encompass any device (or combination of devices) having at least one processor that executes instructions from a memory medium.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken FIGS. 1 and 2—Exemplary Participant Locations FIG. 1 illustrates an exemplary embodiment of a videoconferencing participant location, also referred to as a videoconferencing endpoint or videoconferencing system (or videoconferencing unit). The videoconferencing system 103 may have a system codec 109 to manage both a speakerphone 105/107 and videoconferencing hardware, e.g., camera 104, display 101, speakers 171, 173, 175, etc. The speakerphones 105/107 and other videoconferencing system components may be coupled to the codec 109 and may receive audio and/or video signals from the system codec 109.

In some embodiments, the participant location may include camera 104 (e.g., an HD camera) for acquiring images (e.g., of participant 114) of the participant location. Other cameras are also contemplated. The participant location may also include display 101 (e.g., an HDTV display). Images acquired by the camera 104 may be displayed locally on the display 101 and/or may be encoded and transmitted to other participant locations in the videoconference. In some embodiments, images acquired by the camera 104 may be encoded and transmitted to a multipoint control unit (MCU), which then provides the encoded stream to other participant locations (or videoconferencing endpoints)

The participant location may further include one or more input devices, such as the computer keyboard 140. In some embodiments, the one or more input devices may be used for the videoconferencing system 103 and/or may be used for one or more other computer systems at the participant location, as desired.

The participant location may also include a sound system 161. The sound system 161 may include multiple speakers including left speakers 171, center speaker 173, and right speakers 175. Other numbers of speakers and other speaker configurations may also be used. The videoconferencing system 103 may also use one or more speakerphones 105/107 which may be daisy chained together.

In some embodiments, the videoconferencing system components (e.g., the camera 104, display 101, sound system 161, and speakerphones 105/107) may be coupled to a system codec 109. The system codec 109 may be placed on a desk or on the floor. Other placements are also contemplated. The system codec 109 may receive audio and/or video data from a network, such as a LAN (local area network) or the Internet. The system codec 109 may send the audio to the speakerphone 105/107 and/or sound system 161 and the video to the display 101. The received video may be HD video that is displayed on the HD display. The system codec 109 may also receive video data from the camera 104 and audio data from the speakerphones 105/107 and transmit the video and/or audio data over the network to another conferencing system, or to an MCU for provision to other conferencing systems. The conferencing system may be controlled by a participant or user through the user input components (e.g., buttons) on the speakerphones 105/107 and/or input devices such as the keyboard 140 and/or the remote control 150. Other system interfaces may also be used.

In various embodiments, the codec 109 may implement a real time transmission protocol. In some embodiments, the codec 109 (which may be short for "compressor/decompressor" or "coder/decoder") may comprise any system and/or method for encoding and/or decoding (e.g., compressing and decompressing) data (e.g., audio and/or video data). For example, communication applications may use codecs for encoding video and audio for transmission across networks, including compression and packetization. Codecs may also be used to convert an analog signal to a digital signal for transmitting over various digital networks (e.g., network, PSTN, the Internet, etc.) and to convert a received digital signal to an analog signal. In various embodiments, codecs may be implemented in software, hardware, or a combination of both. Some codecs for computer video and/or audio may utilize MPEG, Indeo™, and Cinepak™, among others.

In some embodiments, the videoconferencing system 103 may be designed to operate with normal display or high definition (HD) display capabilities. The videoconferencing system 103 may operate with network infrastructures that support T1 capabilities or less, e.g., 1.5 mega-bits per second or less in one embodiment, and 2 mega-bits per second in other embodiments.

Note that the videoconferencing system(s) described herein may be dedicated videoconferencing systems (i.e., whose purpose is to provide videoconferencing) or general purpose computers (e.g., IBM-compatible PC, Mac, etc.) executing videoconferencing software (e.g., a general purpose computer for using user applications, one of which performs videoconferencing). A dedicated videoconferencing system may be designed specifically for videoconferencing, and is not used as a general purpose computing platform; for example, the dedicated videoconferencing system may execute an operating system which may be typically streamlined (or "locked down") to run one or more applications to provide videoconferencing, e.g., for a conference room of a company. In other embodiments, the videoconferencing system may be a general use computer (e.g., a typical computer system which may be used by the general public or a high end computer system used by corporations) which can execute a plurality of third party applications, one of which provides videoconferencing capabilities. Videoconferencing systems may be complex (such as the videoconferencing system shown in FIG. 1) or simple (e.g., a user computer system 200 with a video camera, input devices, microphone and/or speakers such as the videoconferencing system of FIG. 2). Thus, references to videoconferencing systems, endpoints, etc. herein may refer to general computer systems which execute videoconferencing applications or dedicated videoconferencing systems. Note further that references to the videoconferencing systems performing actions may refer to the videoconferencing application(s) executed by the videoconferencing systems performing the actions (i.e., being executed to perform the actions).

The videoconferencing system 103 may execute various videoconferencing application software that presents a graphical user interface (GUI) on the display 101. The GUI may be used to present an address book, contact list, list of previous callees (call list) and/or other information indicating other videoconferencing systems that the user may desire to call to conduct a videoconference. The GUI may also present options for recording a current videoconference, and may also present options for viewing a previously recorded videoconference, e.g., using the methods described herein.

Figure 2:

Note that the videoconferencing system shown in FIGS. 1 and 2 may be modified to be an audioconferencing system. For example, the audioconference could be performed over a network, e.g., the Internet, using VOIP. The audioconferencing system, for example, may simply include speakerphones 105/107, although additional components may also be present. Additionally, note that any reference to a "conferencing system" or "conferencing systems" may refer to videoconferencing systems or audio conferencing systems (e.g., teleconferencing systems). In the embodiments described below, the conference is described as a videoconference, but note that the methods may be modified for utilization in an audioconference.

Figure 3A:
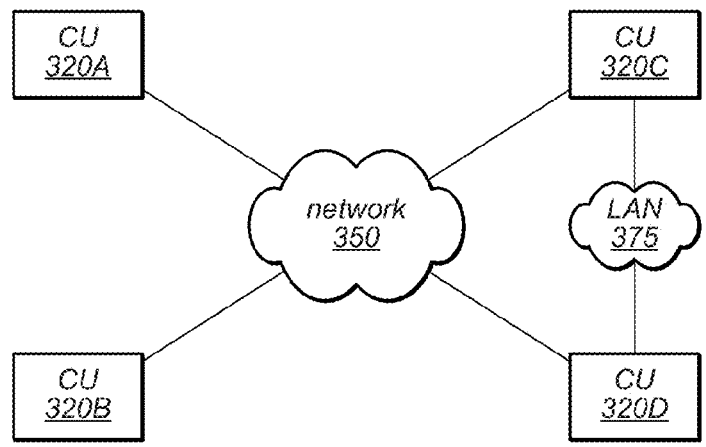
FIGS. 3A and 3B illustrate exemplary conferencing systems coupled in different configurations, according to some embodiments.
Figure 3B:
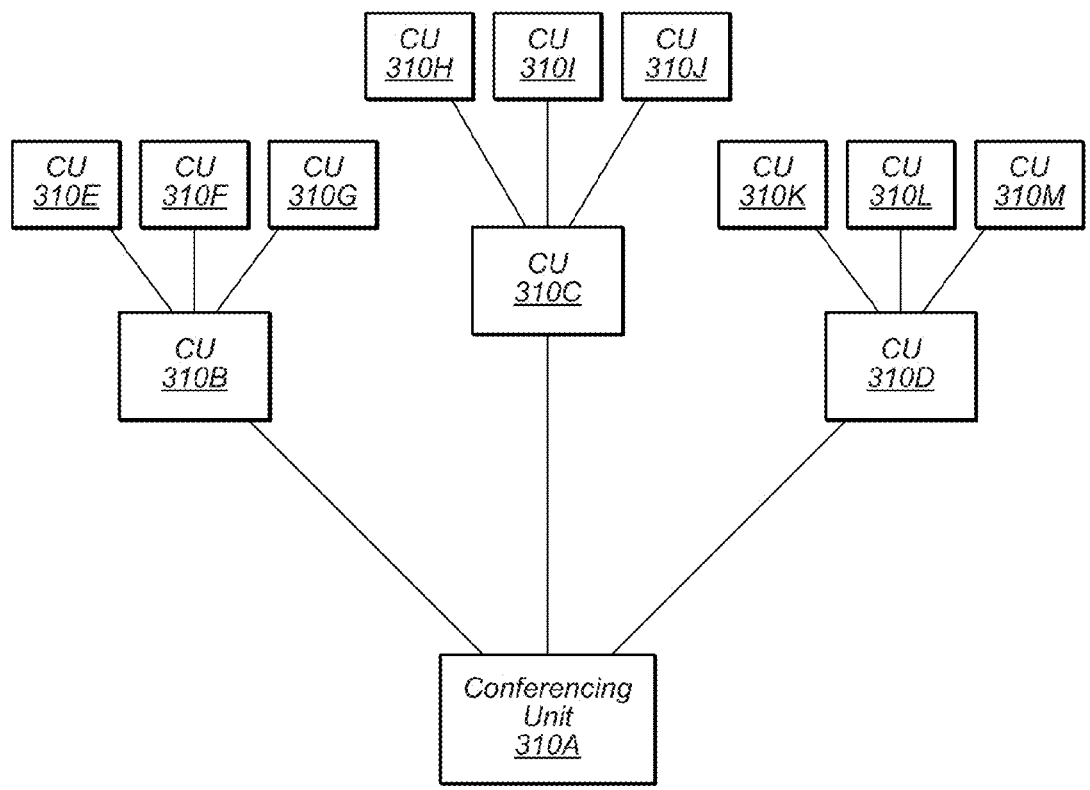

FIGS. 3A and 3B—Coupled Conferencing Systems

FIGS. 3A and 3B illustrate different configurations of conferencing systems. The conferencing systems may be operable to perform the methods described herein. As shown in FIG. 3A, conferencing systems (CUs) 320A-D (e.g., videoconferencing systems 103 described above) may be connected via network 350 (e.g., a wide area network such as the Internet) and CU 320C and 320D may be coupled over a local area network (LAN) 375. The networks may be any type of network (e.g., wired or wireless) as desired.

FIG. 3B illustrates a relationship view of conferencing systems 310A-310M. As shown, conferencing system 310A may be aware of CU 310B-310D, each of which may be aware of further CU's (310E-310G, 310H-310J, and 310K-310M respectively). CU 310A may be operable to perform the methods described herein. In a similar manner, each of the other CUs shown in FIG. 3B, such as CU 310H, may be able to perform the methods described herein, as described in more detail below. Similar remarks apply to CUs 320A-D in FIG. 3A.

Figure 4:
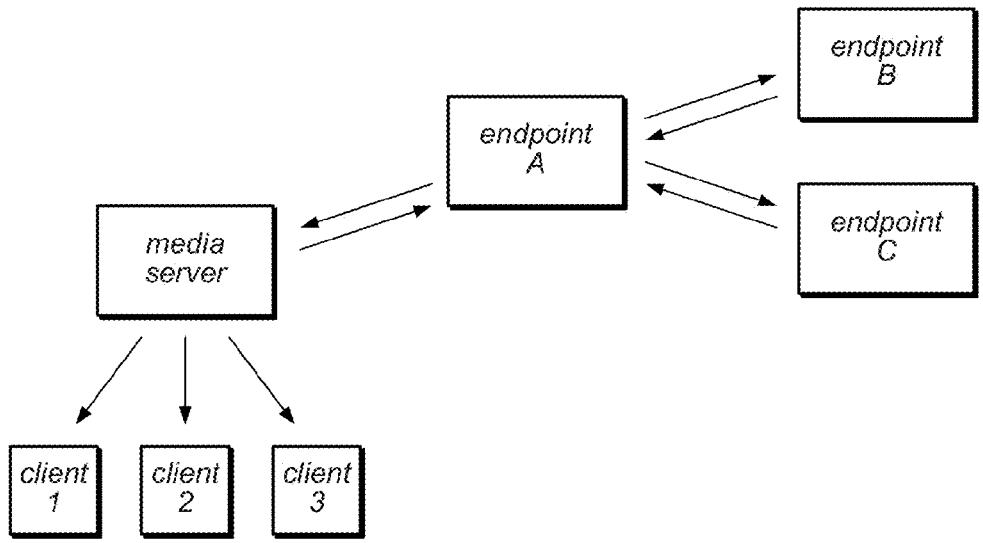
FIG. 4 is a block diagram illustrating endpoints in a videoconference, a recording server, and clients, according to one embodiment.

FIG. 4—Exemplary System Block Diagram Including Media Server

FIG. 4 is a block diagram of a videoconferencing system that includes a media server. As shown, there may be a plurality of videoconferencing endpoints in a videoconference. The videoconference may be performed in the manner described in U.S. patent application Ser. No. 11/252,238, incorporated by reference above, although other configurations are envisioned. As shown in FIG. 4, videoconferencing endpoint A may act as a host or MCU of the videoconference for videoconferencing endpoints B and C. The videoconferencing endpoints A, B, and C may be similar to those described above with respect to FIGS. 1 and 2, although other variations are envisioned. As shown, videoconferencing endpoint A may communicate with both endpoints B and C in a bidirectional manner. For example, endpoint B may provide audio and video generated at the location of B and endpoint C may provide audio and video generated at the location of C. Accordingly, endpoint A may provide videoconferencing information back to B and C, respectively, for presentation to participants at those locations. For example, A may provide a composite image of itself and C to B and a composite image of itself and B to C. However, A may simply provide a composite image of A, B, and C, and each endpoint may present whatever layout they desire (e.g., based on user input), similar to embodiments described below.

In some embodiments, presentation (e.g., Powerpoint®, digital documents, web pages, videos, projections (e.g., of physical documents), scanned documents, etc.) video and/or audio may also be provided. For example, C may provide presentation information to A as well as video from a video input at location C. In some embodiments, the presentation information may be provided separately from the video of the location (e.g., over a different channel or stream), although the video could be combined, e.g., in a composite image. In turn, A may provide the video and/or presentation information, and possibly its own video, to B.

Note that endpoint A, when providing composite images, may also provide information indicating how the composite image is formed, such that the other endpoints can divide and reform new composite images or screen layouts based on the received composite image. For example, A may indicate that the transmitted video from A to B includes four quadrants, a quadrant for A, a quadrant for C's location video, a quadrant for C's presentation, and another quadrant, which could include any number of video sources, e.g., auxiliary video (from a computer, DVD player, etc.), video from B, or from another video camera, e.g., at location A.

Thus, as shown in FIG. 4, a videoconference may be performed between endpoints A, B, and C. As also shown, one of the endpoints of the videoconference (e.g., the host or MCU A) may be coupled to a media server (e.g., a recording and/or streaming server), e.g., via a network, such as the Internet, although in some embodiments, the recording server may be on a network that is local to the endpoint. In another embodiment, the media server may be implemented as part of the MCU or one of the participating endpoints, e.g., the MCU may be implemented as a multi-processor system whereby one or more processors are used for MCU functionality and one or more processors are used for implementing the media server. The media server may be any type of computer server, as desired. In some embodiments, the MCU may provide video and audio of the videoconference to the media server for recording.

Note that the audio and video provided to the media server may be independent from any other streams being sent to the other endpoints. For example, the audio and video provided to the media server may include every endpoint's audio and video (either combined or separately, as desired), whereas videoconference streams sent to each endpoint during the actual videoconference may not typically include its own video (e.g., B may not receive its own video). Thus, in some embodiments the recording server may receive video and audio from of all of the participants, even though during the videoconference various ones (or all) of the participants may receive video and audio from only a subset of the participants, although in other embodiments, this may not be the case. However, in other embodiments, the videoconference information sent for recording may exclude one or more video sources, e.g., in response to user input excluding them (or inversely, not including them) from being recorded.

Additionally, the videoconference information sent for recording may be at a different bit rate, encoding format, resolution, frame rate, or any other variable than the information provided to the other videoconferencing endpoints, as desired. For example, in some embodiments, the videoconference information sent from the MCU to the media server may already be streaming friendly. For example, the MCU may provide the videoconference information to the media server in a format that includes I frames (intra frames) or other information that allows clients to self correct the video (e.g., in the event of lost packets or an interruption). In one embodiment, the videoconference information may be provided in a container format that is used by streaming players (fly, swf, wmv, mov, mp4, etc) and/or may be encoded using the audio/video codecs that is supported by streaming players. Thus, in some embodiments, the media server may not be required to transcode the videoconference before streaming it to clients.

However, in further embodiments, the media server may be able to transcode the received videoconference into a plurality of formats, e.g., in order to provide the videoconference to various types of devices, e.g., which cannot support the original format. Alternatively or additionally, the MCU may provide a plurality of differently coded recordings corresponding to the videoconference, e.g., to support heterogeneous clients. Thus, the information sent to the media server may be independent or unique from any of the other videoconferencing information sent from the MCU to the other endpoints during the videoconference. Additionally, unlike some prior art solutions, where the recording server joins the videoconference as a participant, the information sent to the media server may not include audio/video corresponding to the media server (e.g., where a portion of the videoconference information sent to the recording server includes a blank portion corresponding to the recording server as a participant). Said another way, the media server may not use a port of the MCU and thus may not be considered a "participant" to the videoconference. Accordingly, the media server may not receive any video or composite section that corresponds to the media server.

As also shown, the media server may be coupled to one or more clients. In FIG. 4, the media server is coupled to client 1, client 2, and client 3. The clients may be any type of client as desired. For example, the client may be a typical computer system such as a desktop or laptop computer system, a netbook, a tablet, a mobile device, such as a phone, etc. Generally, a client may be any type of device that is capable of displaying video files or streams to a user. According to embodiments, described herein, the media server may stream the videoconference to the clients, e.g., during the videoconference or after, as desired. Similar to embodiments described above, the streams provided to the clients may include multiple video streams (e.g., for each participant, presentation, etc.) and at least a portion of the video streams may be packaged in composite video (composite video here refers to a video stream that itself contains video from two or more endpoints and hence is a composite of the video from those endpoints, where the composite video is comprises a plurality of composite images). Also similar to above, the media server may provide the video streams to clients with information indicating the layout of the composite video, thereby allowing the client to change the layout of the displayed videoconference during playback.

Note that while the media server is shown as coupled to only endpoint A, the recording server may be coupled to all or any subset of the endpoints of the videoconference, as desired. In some embodiments, it may be especially desirable that the media server is coupled to and receives videoconference information from an endpoint with a high quality connection to the recording server, e.g., over a local area network instead of the Internet or having the highest quality Internet connection between the endpoint and the media server.

Figure 5:
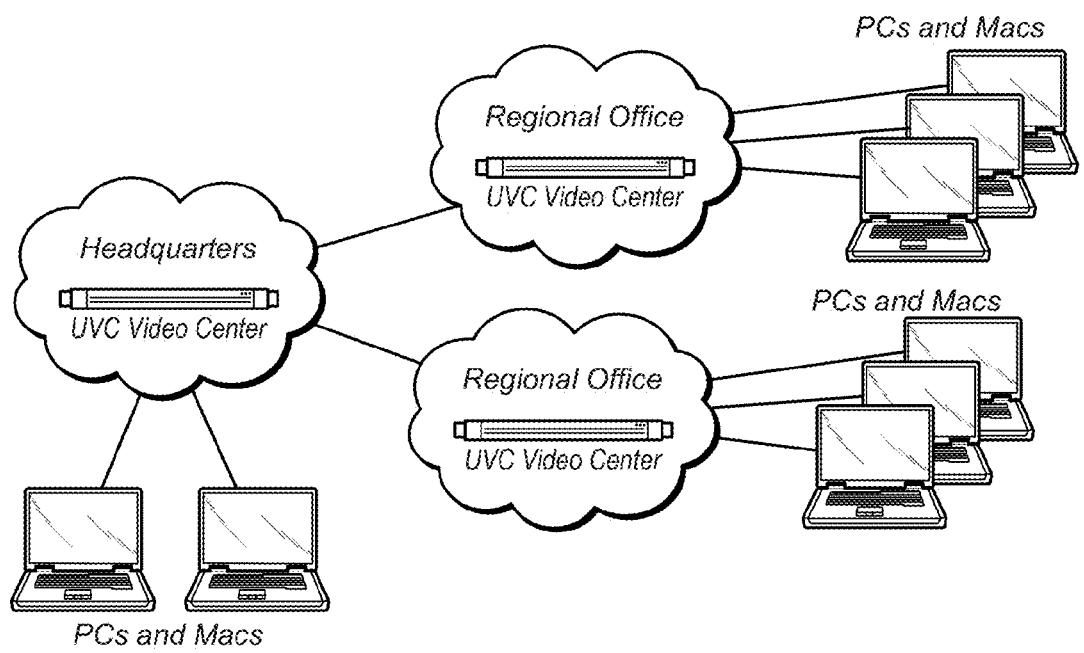
FIG. 5 is a block diagram illustrating a federated server system, including a video media center, according to one embodiment.

FIG. 5—Exemplary Videoconferencing System Including Multiple Media Servers

FIG. 5 illustrates a videoconferencing system having a plurality of clients and a plurality of media servers. In one embodiment, this configuration may be referred to as a "federated media server" system, where there are one or more main or primary media servers and multiple other or secondary media servers.

As shown in this embodiment, a primary media server (shown in FIG. 5 as the headquarters video center) may be coupled to one or more clients, shown as laptops, although more elaborate endpoints are also envisioned. Additionally, the primary media server may be coupled to a plurality of secondary media servers at different remote locations, in this case, regional offices. These media servers are also attached to clients, e.g., at their location or elsewhere.

As discussed above, the media servers may be used for performing recording for and/or for providing video to endpoints and/or computer systems. For example, a plurality of endpoints (e.g., coupled to one or more of the media servers) may use one or more of the media servers to record a current videoconference. Additionally, a plurality of clients (e.g., laptops) may request streams of current or previously recording videoconferences from one of the media centers.

In one particular embodiment, the primary media server shown in FIG. 5 may correspond to the media server of FIG. 4. However, it also possible that the secondary media servers of FIG. 5 may correspond to the media server of FIG. 4. Various embodiments described below may use the federated system shown in FIG. 5, although other systems and configurations are envisioned.

Figure 6:
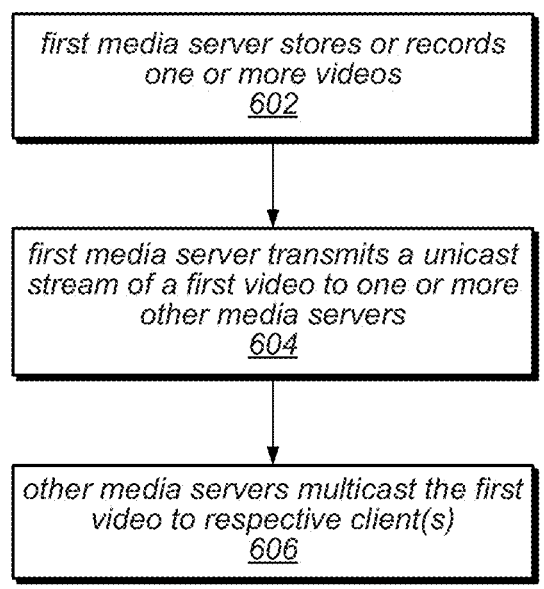
FIG. 6 is a flowchart diagram illustrating an embodiment of a method for multicasting video using a plurality of media servers.

FIG. 6—Multicasting Using a Plurality of Media Servers

FIG. 6 illustrates a method for multicasting a video using a plurality of media servers. The method shown in FIG. 6 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 602, a first media server may store one or more previously recorded videos or may record one or more current videos. For example, the first media server may have recorded or may be recording videoconference(s) according to the methods described in U.S. patent application Ser. No. 13/093,092, which was incorporated by reference in its entirety above. In another embodiment, the videos may have been previously recorded, e.g., by a different media/recording server, and may be stored by the first media server.

In 604, the first media server may provide a first video, which may have been previously recorded or may be currently be recording, to one or more other media servers, e.g., over a wide area network (WAN), such as the Internet. The first media server may be coupled to the other media server(s) similar to the manner shown in FIG. 5, described above. In one embodiment, the media servers may be configured in a federated system, e.g., having a primary media server and secondary media servers (or further servers, such as tertiary media servers, as desired).

For example, the first media server may provide a single stream of the first video to both a second media server and a third media server. Said another way, the first media stream may provide a unicast of the first video to each of the second media server and third media server.

At the same time, a plurality of clients may also be coupled to the first media server. Accordingly, the first media server may be configured to perform multicasting to the plurality of clients, e.g., of the first video (although it may provide a plurality of videos simultaneously). Thus, the first media server may be configured to multicast the first video (and/or other videos) to its clients while unicasting the first video to other media servers.

In 606, the other media server(s) (e.g., the second and third media servers) may multicast the first video to respective clients, e.g., over their respective local area networks (LANs). Similar to the multicasting of the first media server to its clients, these other media servers (e.g., the second and third media servers discussed above) may multicast to their respective clients.

In some embodiments, the other media servers may be configured to transcode the received video to various different streaming formats, e.g., for provision to a heterogeneous group of local clients. For example, the single stream from the first media server may be in a first format (e.g., a first streaming format). The second and third media servers may be configured to transcode that first format into one or more other formats (e.g., in response to requests from clients for the other formats). Accordingly, the second and third media servers may provide the same video in a plurality of different formats (e.g., the first format and/or the one or more other formats) to various local clients. As a specific example, the second and third media servers may provide a first streaming format to a tablet device and a second streaming format to a laptop computer, among other possibilities.

Thus, instead of the first media server multicasting to the clients of other media servers (e.g., forcing provision of multiple streams of the same video to the other servers, thereby reducing available bandwidth), a unicast may be used for the other media servers so that bandwidth may be conserved between the media servers. These other media servers may then perform their own multicasting for their clients, e.g., over their own LANs.

Note that the above-described method is not limited to a single hop (e.g., from the first media server to the other media servers), but may also apply to multiple levels. For example, the other media servers may provide single streams to still further media servers, which may then perform multicasting. Thus, the above-described method may be used in configurations having multiple hops. Additionally, while the above method is described with regard to a single video, it may be applied to a plurality of videos, e.g., being unicast/multicast concurrently (e.g., from the first media server to the second and/or third media servers as well as from those servers to clients. Thus, the method of FIG. 6 is not limited to single recordings or videos at a time.

Figure 7A:
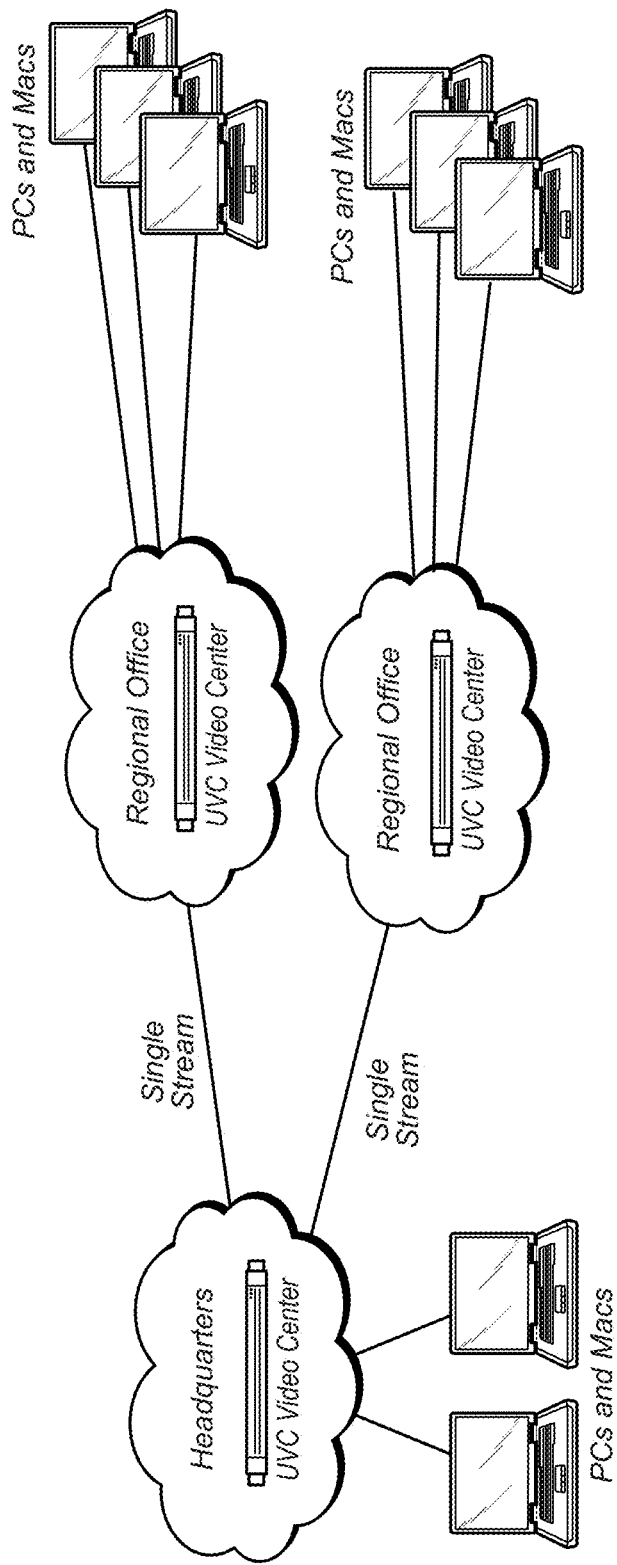
FIGS. 7A and 7B are diagrams corresponding to one embodiment of the method of FIG. 6.
Figure 7B:
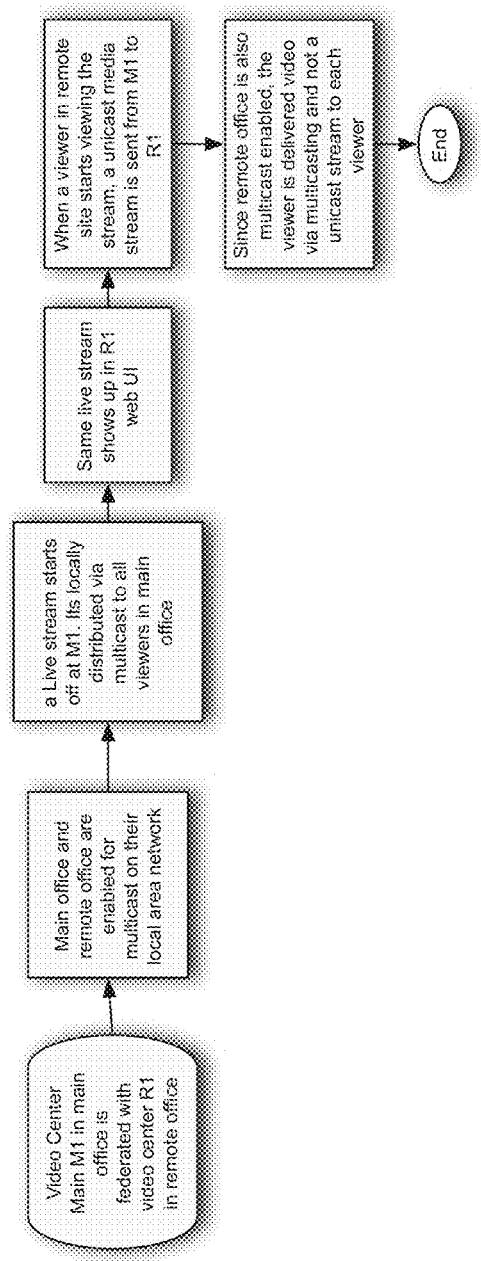

FIGS. 7A and 7B—Exemplary Diagram Corresponding to the Method of FIG. 6

Because bandwidth is generally important and therefore comes at a premium, it may be desirable to conserve it, especially when serving streaming videos to large numbers of viewers. This conservation may be especially important when dealing with high-definition video and so there is need to provide solutions with improved bandwidth utilization.

Turning to distribution of videos, it is generally expensive to setup multicast sessions across a WAN, such as the Internet, between two private networks (e.g., LANs) that are in different geographies, but linked by the wide area network. Multicast is hence mostly limited to a single location and when users from other sites access videos on streaming servers in the multicast enabled site, they are generally served unicast streams. Even if the remote sites are multicast enabled, there is no easy way to stream videos using multicasting across two sites linked by a wide area network.

However, using the method of FIG. 6, a single unicast stream may be used to connect the two sites over the WAN, as shown in FIG. 7A. In turn, the receiving media server may locally serve clients using multicast technology. Accordingly, the server resources consumed to serve users on private network is low as multicasting is being used. Also, the bandwidth used may generally be low since the media servers may generally have only one stream flowing between them when there is video (e.g., videoconferencing) recording and/or live streaming in progress.

FIG. 7B provides a specific embodiment of the method of FIG. 6, which is based on videoconferencing and the configuration shown in FIG. 5. More specifically, as shown in this flowchart:

The video center main m1 in main office may be federated with video center R1 in a remote office.

The main office and remote office may be enabled for multicast on their local area network.

A live stream may begin at M1. It may be locally distributed via multicast to all viewers in the main office.

The same live stream may be shown in a user interface at R1.

A viewer in the remote site may request to begin viewing the stream. Accordingly, M1 may receive a unicast media stream from M1.

Since the remote office is also multicast enabled, the viewer may be delivered the video via multicasting and not a unicast stream to each viewer.

Thus, the method of FIG. 6 may provide the following advantages:

Saves compute resources & bandwidth used

Helps to build a massively scalable setup without having to pay large amount for media servers to handle video streaming with low latency.

Figure 8:
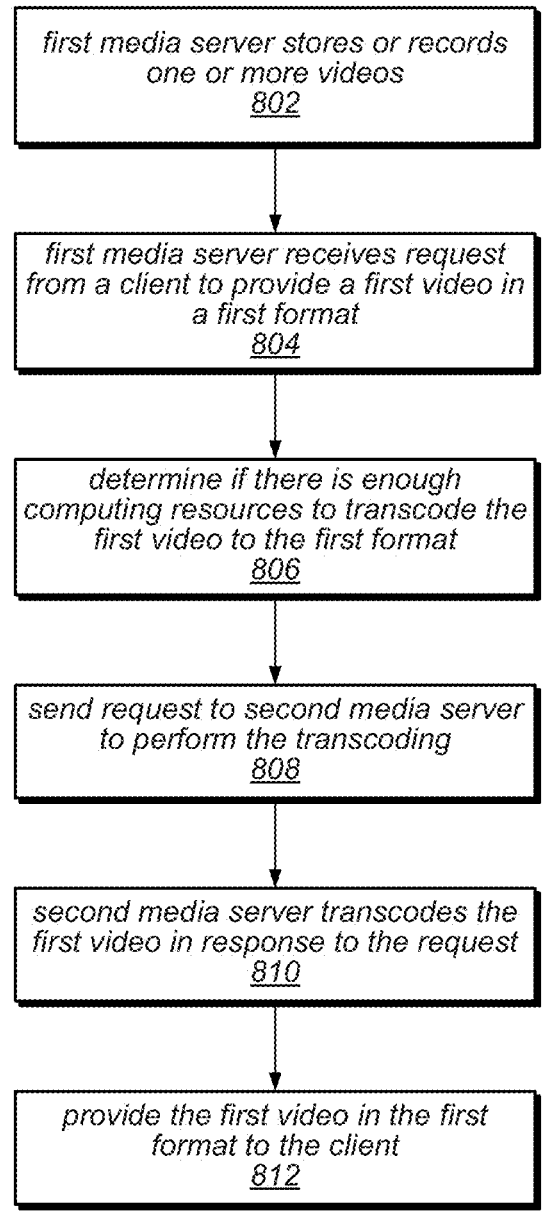
FIG. 8 is a flowchart diagram illustrating an embodiment of a method for offloading transcoding.

FIG. 8—Offloading Transcoding

FIG. 8 illustrates a method for offloading transcoding of a video using a plurality of media servers. The method shown in FIG. 8 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 802, a first media server may store one or more previously recorded videos or may record one or more current videos, similar to 602 above.

In 804, the first media server may receive a request from a client to provide a first video (e.g., a recording) in a first format (e.g., a first streaming format). In the embodiment of FIG. 8, the first video may not currently be recorded or stored in the first streaming format. For example, the first video may have been initially recorded in an initial format (or an initial set of formats), which is different from the first streaming format. As a specific example, the first video may have been recorded in a high definition (HD) format, but the request may have been received from a portable device (such as a tablet or smart phone) which requires a lower resolution and/or differently formatted video. Thus, the requested format and the available formats may be different.

In 806, the first media server may determine whether there is sufficient computing resources (e.g., processing) to transcode the first video to the first format. For example, the first media server may use a threshold amount of available processing, such as 10%, 25%, etc. of processing, a threshold number of available flops, etc. Other thresholds or methods are envisioned.

Note that the determination in 806 may be performed at various points in time. For example, the determination may occur before any transcoding of the first video is performed, e.g., where the first media server does not have enough computing resources to perform the transcoding when the request of 804 is received. However, the determination may also occur at later points, e.g., after the first media server has already begun transcoding the first video. For example, the first media server may begin the transcoding, but may later have insufficient computing resources to continue the transcoding. Accordingly, the following steps may also occur after the transcoding has begun, but before it is finished, as desired.

For the following steps, it may be assumed that the first media server determined that there was not sufficient computing resources to perform the transcoding in 806; however, it is to be understood that the first media server may be configured to perform the transcoding when sufficient computing resources are available.

In 808, a request may be sent to a second media server to transcode the first video to the first format. For example, the request may be sent from the first media server to the second media server. If the second media server does not already store the first video, the first video may also be sent to the second media server (e.g., as a file or as a stream, as desired).

Accordingly, in 810, the second media server may transcode the first video to the first format. The transcoding may be performed according to any number of methods, e.g., using software routines to convert from the original format to the requested first format.

In 812, the first video in the first format may be provided (e.g., streamed) to one or more clients, e.g., including the client that requested the first video in the first format. In one embodiment, the first video may be provided back to the first media server, which may then provide the first video to the client(s). Alternatively, the first video may be provided from the second media server to the requesting client without using the first media server.

Figure 9:
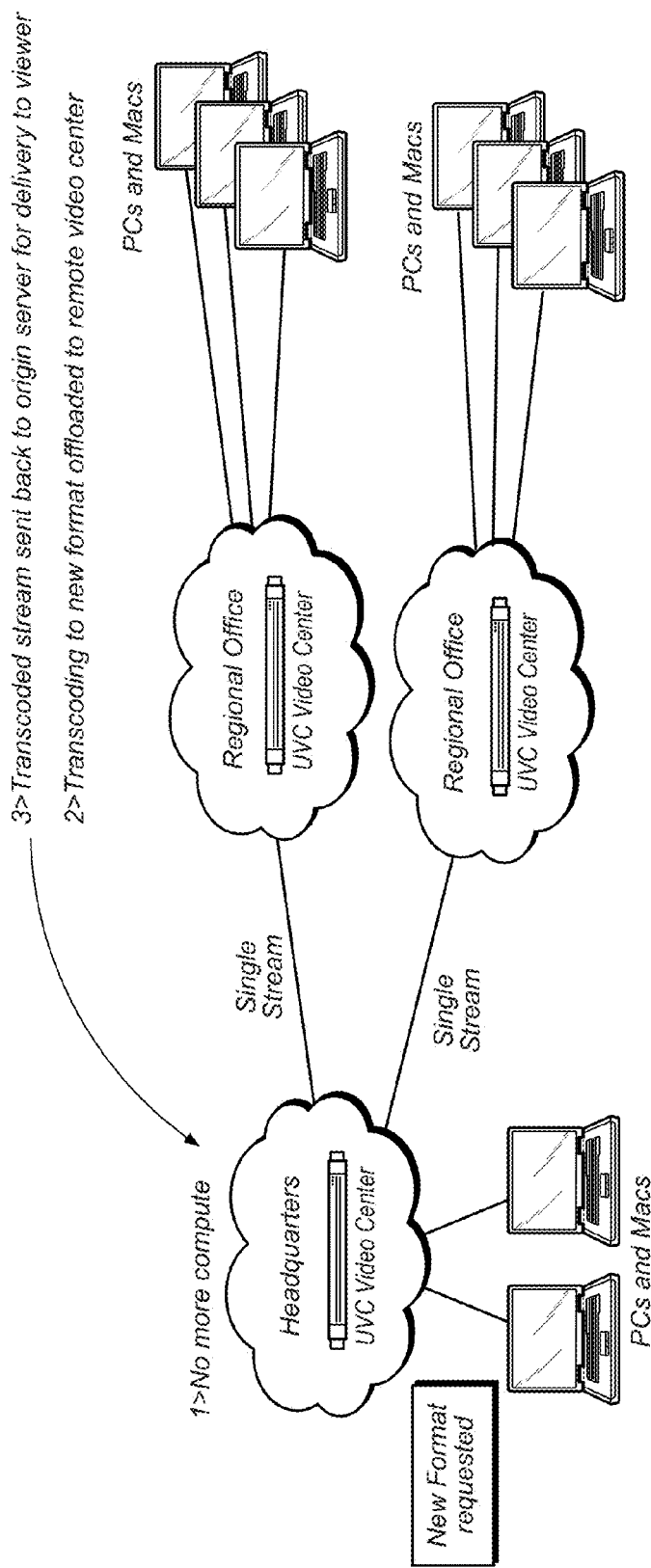
FIG. 9 is a diagram corresponding to one embodiment of the method of FIG. 8.

FIG. 9—Exemplary Diagram Corresponding to the Method of FIG. 8

Computer resources available on the media servers may be limited. Additionally, operations such as streaming to portable (e.g., iOS™) devices and streaming at multiple bitrates may consume significant server resources. When a singe video center is out of compute resources, a new transcoding request may be rejected and users hoping to get that transcoded stream may not be able to watch the video. It could be a lower bitrate that cannot be provided for users with low speed Internet connection so that they can view the streaming sessions. In a federated setup (e.g., similar to FIG. 5), where there are multiple video centers working in unison, there may be methods to leverage the compute resources of each of the nodes in the federated setup, such as those indicated above regarding FIG. 8.

More specifically, when multiple video centers are federated such as shown in the network diagram of FIG. 5, and one of them is out of resources, the video center can hand off the transcoding job to the federated video center that has server resources. This process may ensure that the viewer connecting to the video center expecting the low bitrate or portable device stream (among other possibilities) will be served a stream of the requested video. The viewer may not be aware of the fact that the stream it is receiving is due to the transcoding work happening on a federated node.

This process is shown graphically in FIG. 9. More specifically, a client of the primary media server requests a video in a new format. The primary media server determines that there are no more compute resources and sends a request to a secondary media server to perform transcoding to the new format. The secondary media server performs the transcoding and sends the transcoded stream back to the original server for delivery to the client. Finally, the primary media server provides the video in the requested format to the client.

Figure 10:
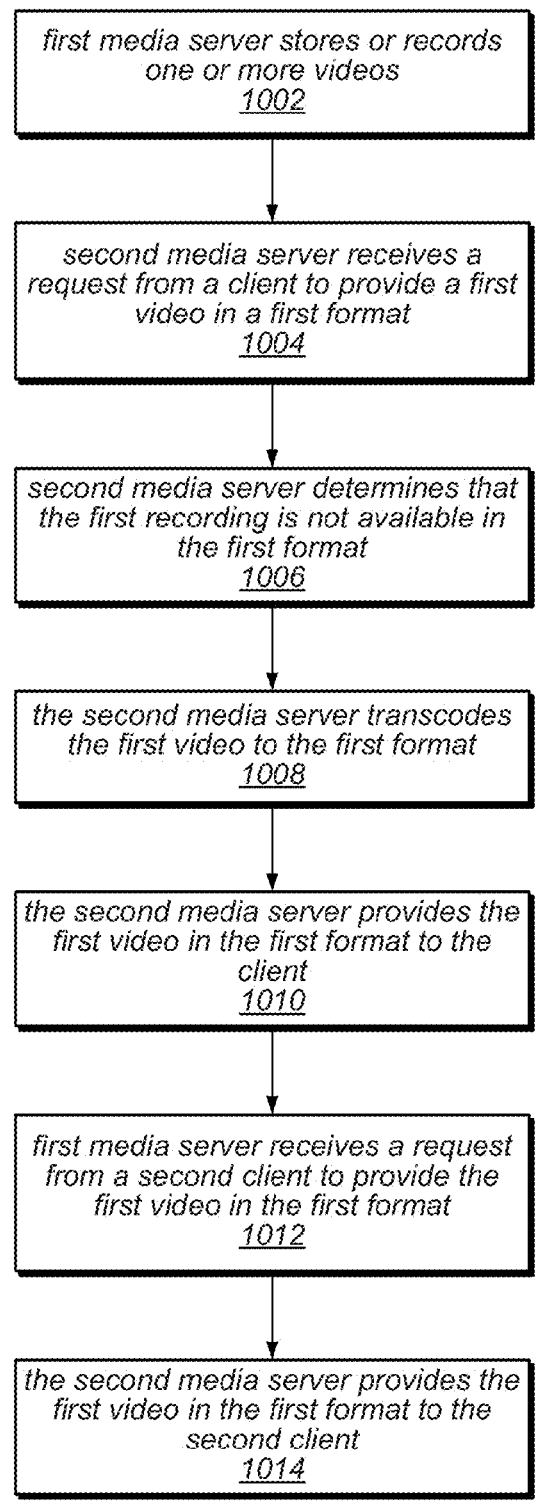
FIG. 10 is a flowchart diagram illustrating an embodiment of a method for performing distributed transcoding.

The following are exemplary broad level advantages of the method of FIG. 8:

Compute resources available on any federated node is made use of before finally rejected a request for new transcoded format Avoids need for putting large server machines in each site since they can share peak load requests effectively using the described mechanism FIG. 10—Distributed Transcoding FIG. 10 illustrates a method for performing distributed transcoding of a video using a plurality of media servers. The method shown in FIG. 10 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 1002, a first media server may store one or more previously recorded videos or may record one or more current videos, similar to 602 above.

In 1004, a second media server may receive a request from a client to provide a first video (e.g., of the one or more previously recorded videos or current videos of 1002) in a first format (e.g., a first streaming format).

In 1006, the second media server may determine if the first recording is available in the first format. For example, the second media server may determine if the first recording is locally available and/or if it is available at the first media server. Where the first recording is available, the second server may determine if the recording is available in the requested format (e.g., locally or at another media server, such as the first media server described above). If it is available, then the server may provide the first video in the first format to the client, e.g., locally, or via the first media server, as requested.

However, if the first recording is not available in the first format, in 1008, the second media server may transcode the first recording to the first format. If the first video was not stored locally, this 1008 may involve retrieving the first video (e.g., in a different format) from the first media server.

Accordingly, in 1010, the second media server may provide the first video in the first format to the client.

In one particular embodiment, the second media server may already be receiving the first video from the first media server, e.g., in an initial streaming format. This initial streaming format may be provided to one or more local clients of the second media server. However, in 1004, the second media server may receive a request for a format that is different than the one already being provided. Accordingly, in 1006, the second media server may determine if that format is available (e.g., from some other source). Where it is not available, the second media server may be configured to transcode the video from the initial format to the requested format (e.g., from an initial streaming format to a first streaming format) and provide the first streaming format to the requesting device.

In 1012, a second client may request the first video in the first format. The second client may be a client of another media server, e.g., the first media server or a third media server, as desired.

Accordingly, in 1014, the second media server may provide the first video in the first format to the client, e.g., via the other media server (such as the first media server or the third media server, depending on where the client is located).

Figure 11:
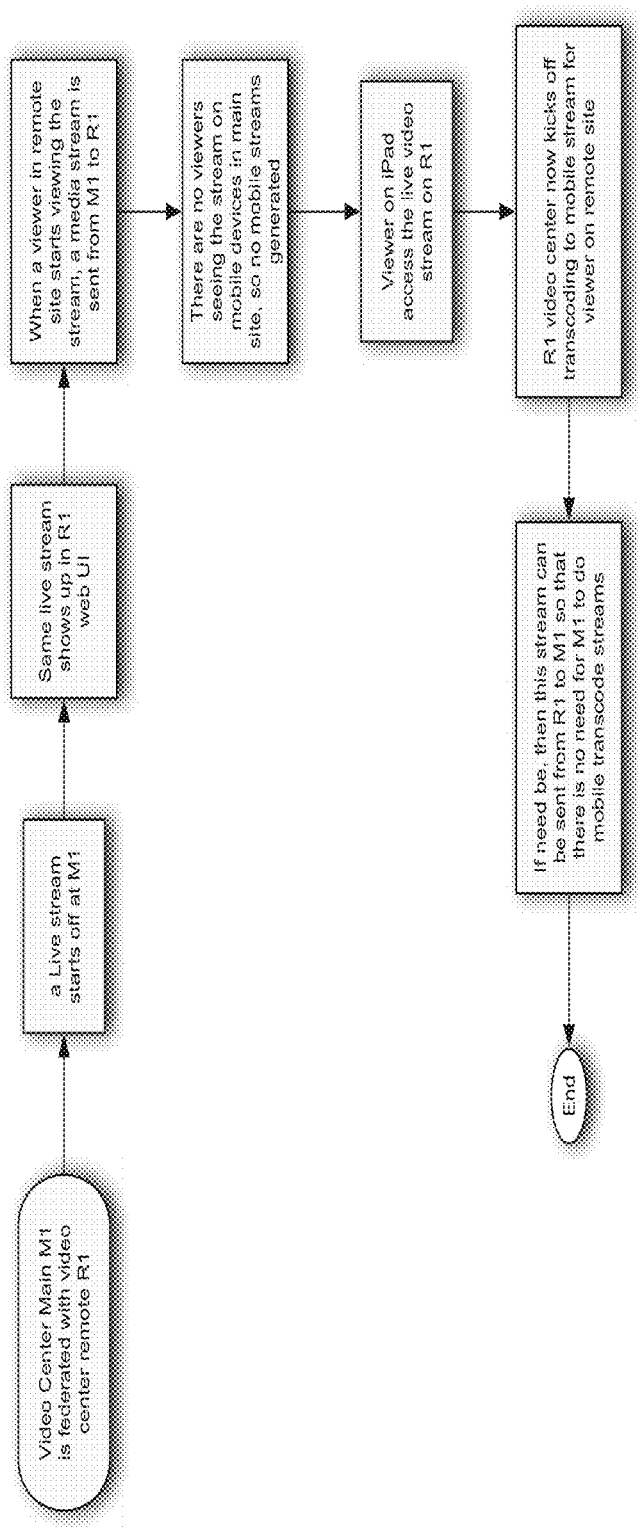
FIG. 11 is a diagram corresponding to one embodiment of the method of FIG. 10.

FIG. 11—Exemplary Diagram Corresponding to the Method of FIG. 10

Even in a federated system, such as that shown in FIG. 5, there may be viewers in remote locations who need to be served specialized streams that are different from the ones coming from the origin (e.g., primary) media server, e.g., where the actual recording is happening.

As a specific example, when one of the viewers in regional office A joins to watch the streaming session from particular device, such as a tablet computer, then the local media server may detect the request is coming from the tablet computer. Accordingly, the local media server may begin a transcode on its side to serve this unique user a tablet computer stream. Note that this may occur even when the primary media server is not doing this transcode—the local media server may begin the transcode based on the request from the tablet computer. In this example, the primary media server is not burdened with the additional transcode, e.g., since its clients did not require or request the tablet device stream.

In this example, if there is a new client connecting by a similar tablet computer for another media server, e.g., the primary media server, then the stream that is already transcoded by the remote media server may be provided to the primary media server for provision to the tablet computer client. Accordingly, the primary media server is not forced to perform the extra transcode.

FIG. 11 provides a specific embodiment of the method of FIG. 10, which is based on videoconferencing and the configuration shown in FIG. 5. More specifically, as shown in this flowchart:

The video center main M1 is federate with video center remote R1.

A live stream is initiated at M1.

The live stream is displayed in a user interface at R1.

When a viewer at R1 begins viewing the stream, a media stream is sent from M1 to R1.

There are no viewers viewing the stream on mobile devices at M1, so no mobile streams are generated.

A viewer on a tablet device (e.g., an iPad™ provided by Apple) accesses the live video stream on R1.

The R1 video center begins transcoding of a mobile stream for the tablet device client.

Additionally, if need be, this stream can be provided from R1 to M1 so that there is no need for M1 to transcode the stream for other mobile users (e.g., where a mobile user requests the stream in a mobile format for M1).

The following are the broad level advantages of this method:

Conserves CPU resources using the benefits of federation;

Conserves bandwidth since an additional stream need not flow from location A to B since it is B that can produce; and If different formats are needed at different sites depending on the bandwidth condition of the site, then this mechanism can help build a scalable system.

Figure 12:
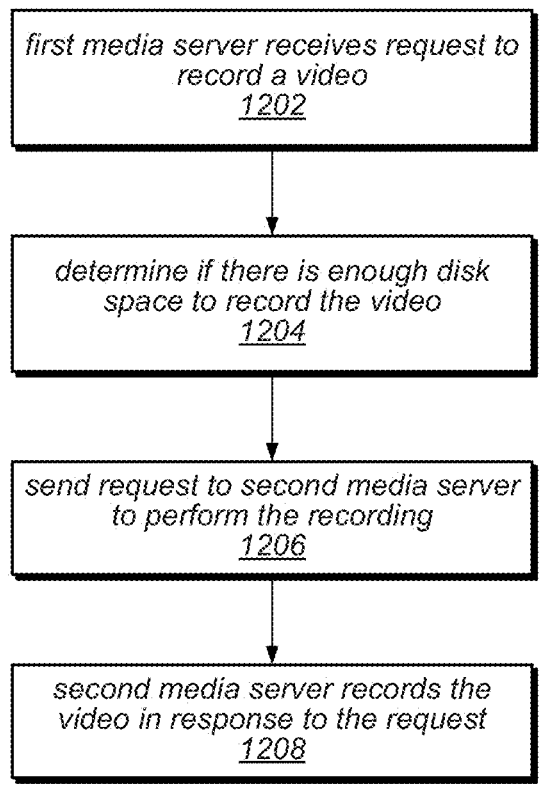
FIG. 12 is a flowchart diagram illustrating an embodiment of a method for offloading recording based on disk space constraints.

FIG. 12—Offloading Recording Due to Disk Space Constraints

FIG. 12 illustrates a method for offloading recording due to disk space constraints using a plurality of media servers. The method shown in FIG. 12 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 1202, a first media server may receive a request to record a video. For example, the first media server may receive a request to record a videoconference, such as according to the methods described in U.S. patent application Ser. No. 13/093,092, which was incorporated by reference in its entirety above.

In 1204, the first media server may determine whether there is sufficient disk space (e.g., available to the first media server) to perform the recording. For example, the first media server may use a threshold percentage of available disk space, such as 1%, 2%, 5%, 10%, etc., a threshold amount of disk space (e.g., 250 megabytes, 500 megabytes, 1 gigabyte, 2 gigabytes, 5 gigabytes, etc. Other thresholds may also be used.

Note that the determination in 1204 may be performed at various points in time. For example, the determination may occur before any recording is performed, e.g., where the first media server does not have enough disk space to perform the adequately perform the recording when the request of 1202 is received. However, the determination may also occur at later points, e.g., after the first media server has already begun recording the video. For example, the first media server may begin the recording, but may later have insufficient disk space to continue performing the recording. Accordingly, the following steps may also occur after the recording has begun, but before it is finished, as desired.

For the following steps, it may be assumed that the first media server determined that there was not sufficient computing resources to perform the transcoding; however, it is to be understood that the first media server may be configured to perform the transcoding when sufficient computing resources are available.

In 1206, a request may be sent to a second media server to record the video. For example, the request may be sent from the first media server to the second media server. Where the recording is already underway, the first media server may also send the initial portion of the recording to the second media server. Alternatively, the second media server may simply begin immediately and the two portions may be combined at a later point, as desired.

Accordingly, in 1208, the second media server may record the video instead of the first media server. The hand-off from the first media server to the second media server may be performed in a seamless manner, without interrupting recording of the video. For example, the hand-off may be completely transparent to any users involved (e.g., participants in a videoconference, where the video corresponds to a videoconference). Thus, the users may be unaware of the technical issue and resolution, and the process may be performed automatically.

In some embodiments, to accomplish this recording, the first media center may forward the information that is being recorded (e.g., the streams from the individual endpoints, or a composite stream). In one embodiment, the first media server may still perform the processing required to perform the recording (e.g., to form the video stream that should be recorded and/or convert it to a desired format), but may use the disk space of the second media server for storage. In some embodiments, processing of the recording may be distributed among the first and second media servers, as desired. Alternatively, the first media center may be removed from the pathway and the second media server may receive the information that is being recorded from the source or at least not via the first media server.

In embodiments where the video is initially recorded at the first media server and then completed by the second media server, the video portions may be combined by the first media server and/or the second media server, e.g., after recording is complete. Then, the complete recording may be stored at a media server, such as the second media server (or even the first media server if disk space becomes available). However, in another embodiment, the initial portion of the recording may be provided to the second media server at the time of hand-off. The second media server may simply add on to this portion during recording or combine them later, as desired.

Additionally, one or more of the servers may be configured to transcode the video being recorded into any of a variety of formats and provide the video to clients, similar to embodiments discussed above.

Figure 13:
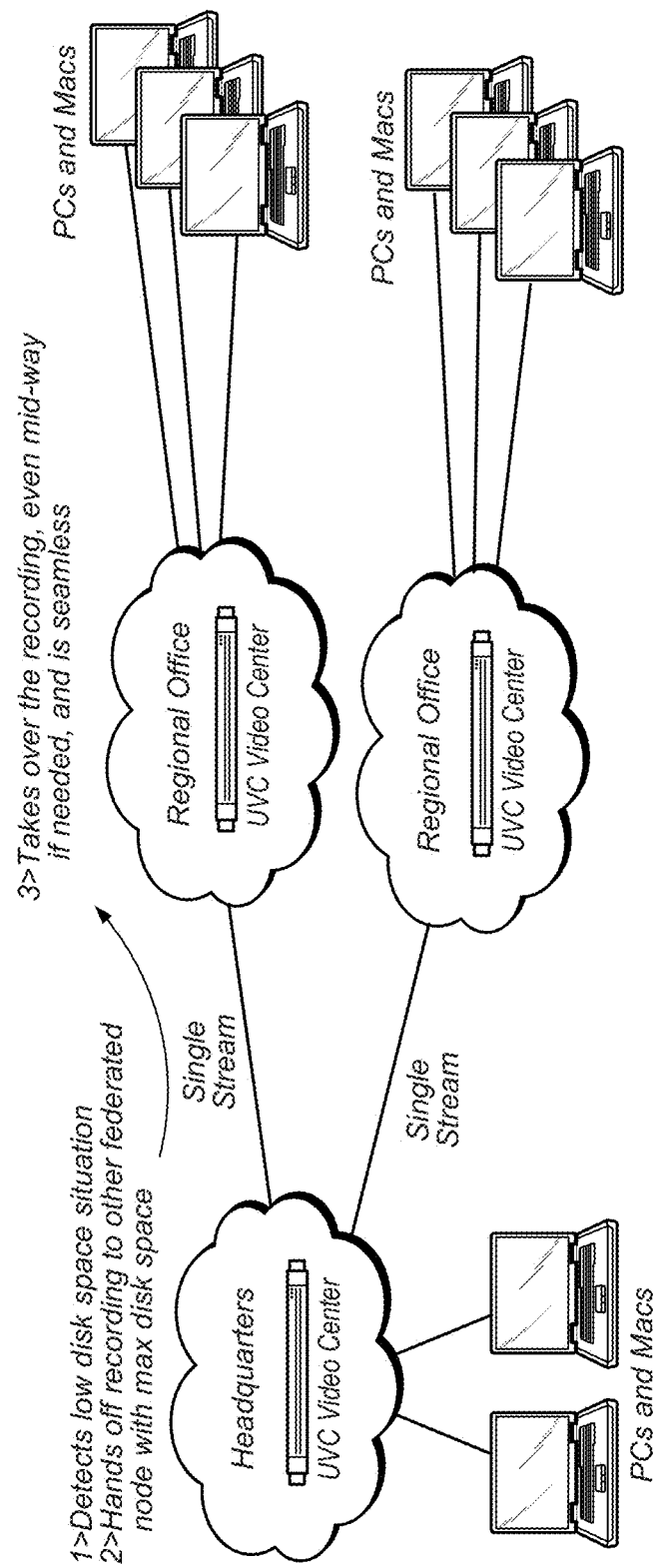
FIG. 13 is a diagram corresponding to one embodiment of the method of FIG. 12.

FIG. 13—Exemplary Diagram Corresponding to the Method of FIG. 12

Disk space or other storage of a media server may be limited, e.g., in embodiments where media servers do not use network storage. Accordingly, when a media server is out of disk space or highly utilized, a new recording session, especially with multiple formats (for mobile devices for example), may be rejected or otherwise may be difficult to perform. In a federated system, e.g., such as shown in FIG. 5, where there are multiple media servers, each media server may have access to its own local storage so storage can be utilized more effectively.

Accordingly, when multiple media nodes are federated as shown in the network diagram of FIG. 5, and one of them is out of disk space or is nearing a high percentage of disk utilization, the media center that is responsible for the recording can utilize the storage on one of the other federated media servers. Accordingly, the original media server may act as the recording proxy to the remote media server. The live streaming sessions can be handled by both the original and the remote media server, depending on the existing demand. This process may ensure that the recording session is not affected even though the original recording media server is out of storage space. Once recording is complete, the recording may reside on the remote media server and may be served to viewers on the original media server center using the federation feature.

As shown in FIG. 13, this mode process may be utilized in even during a long recording session when the original media server sees that it is getting close to the disk space limit and avoids disrupting the recording by handing off seamlessly to the remote media server to continue with the rest of the recording.

The following are the broad level advantages of the method:

Effective disk space utilization across federated media servers

Ensures completion of recording requests since federated media servers aim to achieve balancing of disk space utilization Further Embodiments While various embodiments discussed above relate to videoconferences, these embodiments may apply to any type of audio or video recordings or streams, as desired. Thus, the above-described embodiments are not limited to videoconferences and related recordings.

Embodiments of a subset or all (and portions or all) of the above may be implemented by program instructions stored in a memory medium or carrier medium and executed by a processor.

In some embodiments, a computer system at a respective participant location may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method for providing a recording, comprising:
    a first computer system storing at least one recording;
    the first computer system receiving a request from a first client to provide a first recording of the at least one recording in a first streaming format;
    the first computer system determining whether there are sufficient computing resources for the first computer system to transcode the first recording to the first streaming format, wherein in response to determining that there are sufficient computing resources, the first computer system is configured to perform the transcoding of the first recording to the first streaming format;
    in response to determining that there are not sufficient computing resources:
        the first computer system sending a request to a second computer system server to transcode the first recording to the first streaming format;
        the first computer system receiving the first recording in the first streaming format from the second computer system; and
        the first computer system providing the first recording in the first streaming format to the first client.

2. The method of claim 1, further comprising:
    the first computer system beginning transcoding of the first recording to the first streaming format;
    wherein said determining that there are not sufficient computing resources is performed after beginning transcoding of the first recording to the first streaming format.

3. The method of claim 1, further comprising:
    the first computer system recording the first recording, wherein said receiving the request is performed during said recording.

4. The method of claim 3, wherein said recording is performed in a video format that is different from the first streaming format.

5. The method of claim 1, wherein the at least one recording comprises one or more videoconference recordings, wherein the first recording is of a first videoconference.

6. The method of claim 1, wherein the first computer system comprises a primary media server in a federated server system, wherein the second computer system comprises a secondary media server in the federated server system.

7. The method of claim 1, wherein the first client comprises a portable device.

8. A non-transitory, computer accessible memory medium storing program instructions for providing a recording, wherein the program instructions are executable by a processor of a first computer system to:
    receive a request from a first client to provide a first recording in a first streaming format;
    determine whether there are sufficient computing resources of the first computer system to transcode the first recording to the first streaming format, wherein in response to determining that there are sufficient computing resources, the first computer system is configured to perform the transcoding of the first recording to the first streaming format;
    in response to determining that there are not sufficient computing resources:
        send a request to a second computer system to transcode the first recording to the first streaming format;
        receive the first recording in the first streaming format from the second computer system; and
        provide the first recording in the first streaming format to the first client.

9. The non-transitory, computer accessible memory medium of claim 8, wherein the program instructions are further executable to:
    begin transcoding of the first recording to the first streaming format;
    wherein said determining that there are not sufficient computing resources is performed after beginning transcoding of the first recording to the first streaming format.

10. The non-transitory, computer accessible memory medium of claim 8, wherein the program instructions are further executable to:
    record the first recording, wherein said receiving the request is performed during said recording.

11. The non-transitory, computer accessible memory medium of claim 10, wherein said recording is performed in a video format that is different from the first streaming format.

12. The non-transitory, computer accessible memory medium of claim 8, wherein the first recording is also stored on the memory medium, wherein the first recording is comprised in a plurality of recordings.

13. The non-transitory, computer accessible memory medium of claim 12, wherein the plurality of recordings comprise one or more videoconference recordings, wherein the first recording is of a first videoconference.

14. The non-transitory, computer accessible memory medium of claim 8, wherein the first computing system is a primary media server in a federated server system, wherein the second computer system comprises a secondary media server in the federated server system.

15. The non-transitory, computer accessible memory medium of claim 8, wherein the first client comprises a portable device.

16. A federated media server system, comprising:
   a first media server, wherein the first media server stores at least one recording, and wherein the first media server is coupled to one or more clients;
   a second media server coupled to the first media server;
   wherein the first media server is configured to:
      receive a request from a first client to provide a first recording of the at least one recording in a first streaming format;
      determine whether there are sufficient computing resources for the first media server to transcode the first recording to the first streaming format, wherein in response to determining that there are sufficient computing resources, the first computer system is configured to perform the transcoding of the first recording to the first streaming format;
      in response to determining that there are not sufficient computing resources:
         send a request to the second media server to transcode the first recording to the first streaming format;
         receive the first recording in the first streaming format from the second media server; and
         provide the first recording in the first streaming format to the first client.

17. The federated media server system of claim 16, wherein the first media server is further configured to:
   begin transcoding of the first recording to the first streaming format;
   wherein said determining that there are not sufficient computing resources is performed after beginning transcoding of the first recording to the first streaming format.

18. The federated media server system of claim 16, wherein the first media server is a primary media server and wherein the second media server is a secondary media server.

19. The federated media server system of claim 16, wherein the first media server is configured to:
   record the first recording, wherein said receiving the request is performed during said recording.

20. The federated media server system of claim 19, wherein said recording is performed in a video format that is different from the first streaming format.

* * * * *